United States Patent [19]
Skaryd

[11] Patent Number: 5,685,333
[45] Date of Patent: Nov. 11, 1997

[54] CHECK VALVE WITH HYDRAULIC DAMPING SYSTEM

[76] Inventor: William S. Skaryd, 172 Longfellow Dr., Palm Springs, Fla. 33461

[21] Appl. No.: 497,322

[22] Filed: Jun. 30, 1995

[51] Int. Cl.⁶ .................................................. F16K 21/10
[52] U.S. Cl. .................................. 137/514.5; 137/514
[58] Field of Search .................... 137/514.3, 514.5, 137/514

[56] References Cited

U.S. PATENT DOCUMENTS

| | | | |
|---|---|---|---|
| 609,726 | 8/1898 | Ball | 137/514.3 |
| 1,111,319 | 9/1914 | Paulsmeier | 137/514.5 |
| 2,002,451 | 5/1935 | Gray | 137/514.5 |
| 2,339,101 | 1/1944 | Parker | 137/514.5 |
| 2,927,604 | 3/1960 | Johnson | 137/514.5 |
| 2,954,047 | 9/1960 | Faltejsek et al. | 137/514.5 X |
| 3,605,802 | 9/1971 | Hertell | 137/514.5 |
| 3,881,480 | 5/1975 | Lafourcade | 137/514.5 X |
| 4,398,558 | 8/1983 | Cadeddu | 137/514.5 X |

*Primary Examiner*—John Rivell
*Attorney, Agent, or Firm*—McHale & Slavin

[57] ABSTRACT

A check valve with self-replenishing hydraulic damping system having a main valve chamber with an inlet and outlet and an adjustment valve aperture allowing for communication between the main valve chamber and the exterior of the valve. A valve disk is used to prevent upstream fluid flow when the valve disk is engaged with the valve seat. A biasing spring exerts a continuous upstream force upon the valve disk. A piston, one end of which is attached to the valve disk, the other end of which reciprocates with a fluid-filled cylinder having a servant check valve permitting upstream fluid flow into the cylinder and preventing downstream fluid flow out of the cylinder, alternately forces the cylinder fluid out of the cylinder through a control aperture into the main valve chamber by moving downstream and creates a vacuum within the cylinder by moving upstream, thereby replenishing the fluid within the cylinder. A valve needle in dual reciprocation with the adjustment valve aperture and the control aperture allows for control of the rate at which fluid both enters and exits the cylinder. The cylinder is secured inside the valve by a plurality of flanges.

9 Claims, 1 Drawing Sheet

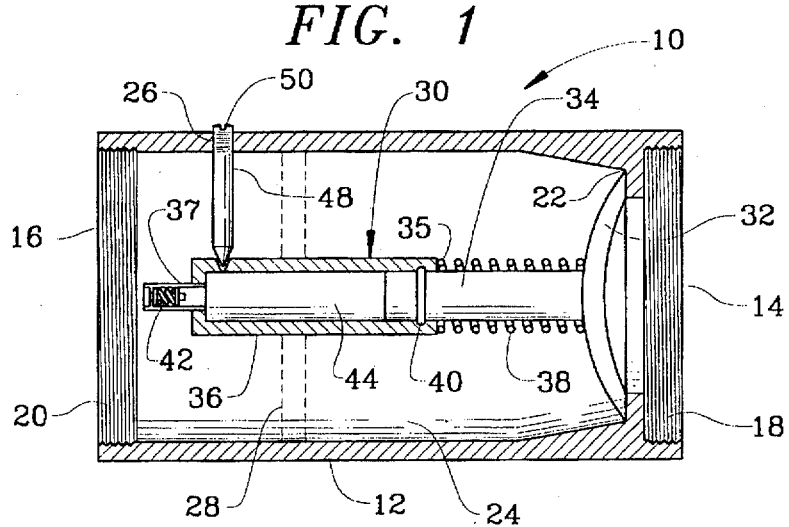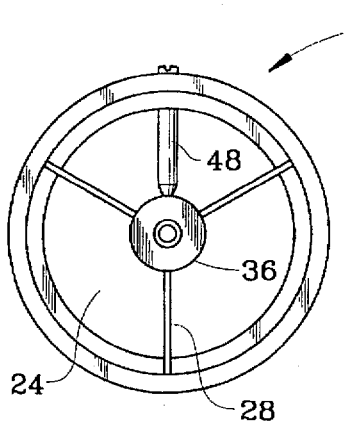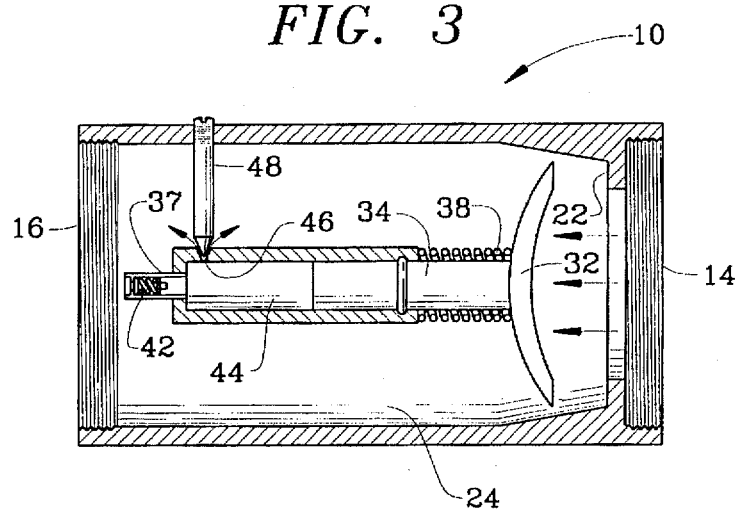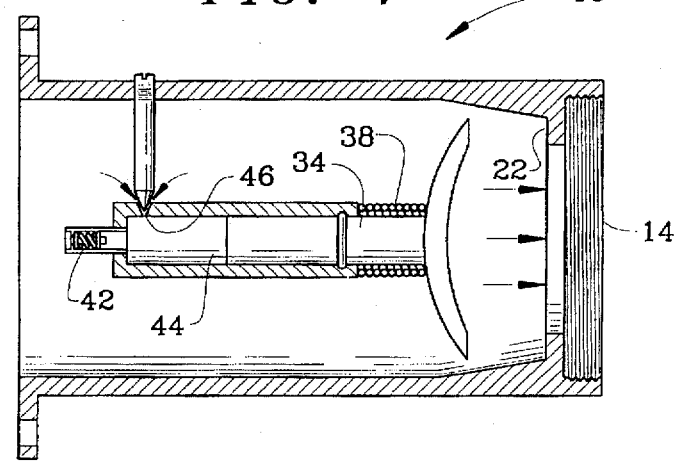

CHECK VALVE WITH HYDRAULIC DAMPING SYSTEM

FIELD OF THE INVENTION

This invention relates to check valves and more particularly to an improved check valve having an inlet which opens at an adjustable rate.

BACKGROUND OF THE INVENTION

In general a check valve is used on compressors, pumps, or blowers to prevent flow of fluids back through the machine or driving force of the fluid line upon occurrence of any conditions under which the output pressure of the machine becomes less than that of the connected distribution line.

Such reversal of flow in machines of the type mentioned above must be positively prevented to avoid damage or even destruction of the machine due to excessive speed.

Further, damage to the machine and its applications must be prevented by easing the rate at which high pressure fluid is introduced into the valve and the outlying fluid line applications.

A check valve must therefore be positively self-closing when the machine delivery pressure drops below the distribution line pressure and must be capable of easing the rate of introduction of fluid into the valve to protect the valve itself and the outlying fluid line applications to which it is attached.

The check valve itself, to be suitable for this type of service, should be constructed so as to operate freely and automatically without chatter, slamming or hammering. It must have a long life, be trouble free and require little or no maintenance.

Check valves are used to allow free flow of fluids in one direction while preventing backflow. The utility of such a function is readily recognized in the context of a community water supply. The desirability of preventing backflow into the community water supply of water once introduced into an individual household is self-evident.

Unidirectional flow control does not address all water distribution problems. For instance, a typical lawn sprinkler system consists of PVC or the like materials. Over time the sprinkler system is typically structurally weakened through the effects of aging or exposure to the elements. Sprinkler systems are susceptible to damage when the materials of construction lack the ability to accomodate a certain water pressure threshold. It is in this context that check valves have also served in a useful prophylactic role.

It is well known that damping devices can be connected to a moving check valve member to ease or slow the movement of the valve member so as to avoid slam closing of the valve member or the deleterious effects on the valve itself and any applications downstream the flow, such as a sprinkler head or weakened construction materials. Such is the case caused by the instantaneous introduction of high pressure fluid into the line, commonly referred to as the "water hammer" effect.

In such prior devices, however, difficulty has been encountered in providing for ready modification of the damping rate of opening and closing of the valve member during operation of the device. Also in such prior devices, exterior connections were required in order for the operation of the damping mechanism such that portability and interchangeability of the valve itself was rendered impossible.

SUMMARY OF THE INVENTION

A check valve with self-replenishing hydraulic damping system having a body with an inlet, an outlet, a seat surrounding communication through said body between said inlet and said outlet, a main valve chamber in simultaneous communication with said inlet and said outlet, an adjustment valve aperture allowing for communication between said main valve chamber and the exterior of said body, a valve disk preventing upstream fluid flow when said valve disk is engaged with said valve seat, a cylinder body having cylinder fluid contained therein when pressure in said outlet is greater than the pressure in said inlet, a biasing means exerting a continuous upstream force upon said valve disk, a servant check valve mounted within said cylinder permitting upstream fluid flow into said cylinder and preventing downstream fluid flow out of said cylinder, a piston, one end of which is in operative downstream association with said valve disk, the other end in mating reciprocation with said cylinder, alternately forcing said cylinder fluid out of said cylinder through said control aperture into said main valve chamber and creating a vacuum within said cylinder thereby replenishing the fluid within said cylinder, a means of maintaining a seal between said piston and said cylinder during reciprocation of said piston in said cylinder, a valve needle one end of which extends through said adjustment valve aperture and terminates exterior said main valve chamber the other end formed so as to adjustably mate with said control aperture when reciprocating in said control aperture, a means of maintaining a seal between said valve needle and said adjustable valve aperture during reciprocation of said valve needle in said adjustable valve aperture, a conventional threaded screw mounted atop said first valve needle, said threaded screw in operative association with said adjustment valve aperture, a plurality of flanges securing said hydraulic damping system to said body whereby said hydraulic damping system is in communication with said main valve chamber.

The main objects of this invention are to provide an improved construction and arrangement of the shock absorptive means that is combined with the valve disk or element in a pressure conduit so as to eliminate chatter, slamming or hammering and so as to cause positive sealing in closing.

Another object of the invention is to provide an improved check valve in which the disk or element is open and closed at differentially controlled rates of movement.

Still another object of the invention is to provide an improved check valve so constructed that the shock absorptive means for damping the valve disk or element is internal the valve body, thus allowing a comparatively clear passageway to the fluid and pressure conduit.

Yet another object of the invention is to provide an improved check valve so constructed that the shock absorptive means damping the valve disk or element requires no external communication such that the valve itself is both portable and interchangeable with other fluid pressure lines.

BRIEF DESCRIPTION OF THE DRAWINGS

FIG. 1 is a cross-sectional side view of the improved check valve of the present invention in a closed no flow position;

FIG. 2 is a plane end view of the check valve;

FIG. 3 is a cross-sectional side view of the improved check valve of the present invention in an initial flow partially open position; and FIG. 4 is a cross-sectional side view of the improved check valve of the present invention in a full open position.

DETAILED DESCRIPTION OF THE PREFERRED EMBODIMENT

Referring in general to the drawings the improved check valve of the present invention is designated by numeral 10 and defined by a first cylindrical body 12 having an inlet 14 and an outlet 16 each of may be coupled to a pressured fluid line (not shown) by threaded perimeters 18 and 20 or a flange connection, not shown. A valve seat 22 is positioned within the valve body 12 formed integral to the valve body and surrounds the inner surface of the inlet 14. Also defined within the body 12 is a valve chamber 24 which is in simultaneous communication with the inlet 14 and the outlet 16 downstream the valve seat 22. Also present in the structure of the body 12 is an adjustment valve aperture 26 which allows for communication between the main valve chamber 24 and the exterior of the body 12.

Suspended within the main valve chamber 24 by a set of braces 28 is a damping mechanism 30 to which a sealing or valve disk 32, is attached. Specifically, the valve disk 32 is attached to a piston 34. The piston 34, in turn, mates with a cylinder 36 at the upstream opening 35 of the cylinder 36. Also attached to the back of the valve disk 32 and to the front of the cylinder 36 is a spring attachment 38. The purpose of the spring attachment 38 is to maintain a continuous biasing force against the valve disk 32 in the direction of the valve seat 22.

At the upstream opening 35 is a ring seal 40 which acts to prevent the fluid inside the cylinder interior chamber 44 from escaping into the main valve chamber 24 through the upstream opening 35 during reciprocation between the piston 34 and the cylinder 36. The downstream opening 37 of the cylinder 36 is conditionally in fluid communication with the main valve chamber 24. In one embodiment, ring seal 40 is a rubber O-ring disposed in a recessed chamber within the cylinder 36. The O-ring is sized to allow sliding motion of piston 34 within the cylinder 36, while preventing unwanted fluid escape between the position 34 and cylinder 36.

Within the downstream opening 37 is a servant check valve 42. The purpose of this servant check valve 42 is to insure that fluid can enter the cylinder chamber 44 from the valve chamber 24 through the downstream opening 37 but fluid cannot exit the cylinder chamber 44 through the downstream opening 37 into the valve chamber 24. The cylinder 36 also has a control aperture 46 which allows controlled fluid communication between the main valve chamber 24 and the cylinder interior chamber 44. Extending from the control aperture 46 to the adjustment valve aperture 26 is a valve needle 48. The valve needle 48 extends through the adjustment valve aperture 26, which is a threaded bore, and terminates exterior the main valve chamber 24 where it is capped off by a conventional threaded screw 50. By rotating the screw 50, and thus the valve needle 48, the valve needle 48 is caused to reciprocate in the control aperture 46 thereby adjustably altering the effective area of the control aperture 46 and, in turn, adjustably altering the potential rate of fluid communication between the cylinder chamber 44 and the valve chamber 24 via the control aperture 46.

Referring more particularly to FIG. 1, there is shown the improved check valve 10 of the present invention in static no-flow state. At this point in time that portion of the cylinder chamber 44 not occupied by a portion of the piston 34 is fully occupied by fluid. Any fluid present in the main valve chamber 24 is prevented from flowing upstream into the inlet 14 by the valve disk 32 which is shown engaged with the valve seat 22.

Referring particularly to FIG. 3, the improved check valve 10 of the present invention is shown reacting to an initial flow of fluid through the pressure fluid system (not shown). As fluid passes through the inlet 14 it forces the valve disk 32 and the piston 34 towards the outlet 16 thereby forcing the fluid inside the cylinder chamber 44 out through the control aperture 46 and into the main valve chamber 24. The fluid inside the cylinder chamber 44 provides resistance against a rapid retraction of the valve disk 32 away from the valve seat 22 thereby preventing the introduction of high pressure fluid into the valve 10 and its outlying applications thus preventing damage to the valve 10 and the outlying applications. By solely adjusting the degree of application of the valve needle 48 against the control aperture 46 the user can control the rate at which fluid escapes the cylinder chamber 44 into the main valve chamber 24 and can therefore control the rate at which the valve disk 32 retracts from the valve seat 22 because the servant check valve 42 does not allow fluid escape through the downstream opening 37 into the main valve chamber 24.

Referring particularly to FIG. 4, the improved check valve 10 of the present invention is shown in its steady-state flow condition at the instant the fluid pressure at the inlet 14 drops below the fluid pressure at the outlet 16. As the ambient fluid pressure begins to decrease, the spring attachment 38 urges the valve disk 32 upstream, back towards the valve disk's 32 resting place on the valve seat 22. As the valve disk 32 moves upstream towards the valve seat 22, thereby pulling the piston 34 with it, a vacuum is created within the cylinder chamber 44 and ambient fluid from the main valve chamber 24 is thusly drawn into the cylinder chamber 44 through both the control aperture 46 and the servant check valve 42. This syringe effect effectively prevents an instantaneous engagement of the valve disk 32 with the valve seat 22 thus preventing structural damage to the valve 10 itself. Further, such automatic replenishment of the fluid within the cylinder chamber 44 also serves to eliminate the need for a source of cylinder chamber 44 fluid external the valve 10 itself. This in turn makes the improved check valve 10 of the instant invention sufficiently self-contained such that it is both portable and interchangeable with appropriate pressure fluid line systems.

Referring particularly to FIG. 2 there is shown a sectional view of the preferred form of damped check valve 10 of the present invention in cross-section. The cylinder 36 with the engaged valve needle 48 is shown. The cylinder 36 is suspended in communication with the flow through the main valve chamber 24 by a set of braces 28. Each flange 28 shown has one end attached to the exterior surface of the cylinder 36 and a second end attached to the interior surface of the check valve body 12.

Although only one embodiment of the present invention has been illustrated and described it will be apparent to those skilled in the art that various changes and modifications may be made therein without departing from the spirit of the invention or the scope of the appended claims.

What is claimed is:

1. A check valve for use in a pressurized fluid line providing an adjustable closure rate, said check valve comprising:

a first cylindrical body defined by a continuous side wall of nominal thickness having an inlet opening and an outlet opening, said inlet having opening fluidly communicated with said outlet opening;

a second cylindrical body formed from a continuous sidewall having an inner diameter, and outer diameter, a first end and a second end, said second cylindrical body centrally positioned within said first cylindrical body;

a piston slidably disposed with said second cylindrical body, said piston extending from said end of said second cylindrical body;

a sealing disk attached to said piston, said sealing disk sized to seat said inlet opening;

a biasing means for biasing said sealing disk against said inlet opening;

a servant check valve disposed within said second end of said second cylindrical body oriented to allow fluid flow into said second cylindrical body, and a control aperture for releasing fluid held in said second cylindrical body into said first cylindrical body.

2. The check valve according to claim 1 wherein said inlet opening and said outlet opening are threaded.

3. The check valve according to claim 1 wherein said inlet opening and said outlet opening are flanged.

4. The check valve according to claim 1 wherein said biasing means is further defined as at least one spring having a predetermined spring constant.

5. The check valve according to claim 1, wherein said second cylindrical body includes a seal ring disposed on said inner diameter, said seal ring having an inner diameter operatively associated with said piston.

6. The check valve according to claim wherein said control aperture is further defined as:

a valve needle extending from a threaded bore disposed in said side wall of said first cylindrical housing to an aperture disposed in said side wall of said second cylindrical housing, said valve needle having a threaded first valve needle end and a second valve needle end, said first valve needle end shaped to engage said threaded bore, said second valve needle end having an insertion end operatively associated with said aperture of said second cylindrical housing.

7. The check valve according to claim 1 wherein said second cylindrical body is secured within said main chamber by a plurality of braces extending between an inner surface of said first cylindrical body and an outer surface of said second cylindrical body.

8. A check valve for use in a pressurized fluid line providing an adjustable closure rate, said check valve comprising:

a second cylindrical body formed from a continuous sidewall having an inner diameter, an outer diameter, a first end and a second end, said second cylindrical body centrally positioned within said first cylindrical body;

a piston slidably disposed within said second cylindrical body having a first end and a second end;

a sealing disk attached to said first end of said piston, said sealing disk sized to seal said inlet opening;

a biasing means for biasing said sealing disk against said inlet opening;

a servant check valve disposed within said second end of said second cylindrical body, said servant check valve oriented to allow fluid flow into said second cylindrical body;

a seal ring secured to said second cylindrical body, said seal ring having an inner diameter operatively associated with said piston;

a valve needle extending from a threaded bore disposed in said side wall of said first cylindrical housing to an aperture disposed in said side wall of said second cylindrical housing, said valve needle having a threaded first valve needle end and a second valve needle end, said first valve needle end shaped to engage said threaded bore, said second valve needle end having an second valve needle end, said first valve needle end shaped to engage said threaded bore, said second valve needle end having an insertion end operatively associated with said aperture of said second cylindrical housing;

a plurality of braces extending between an inner surface of said first cylindrical body and an outer surface of said second cylindrical body.

9. The check valve according to claim 8 wherein said biasing means is further defined as at least one spring having a predetermined spring constant.

* * * * *